Oct. 15, 1968    H. C. NIMRICK    3,405,669
FERTILIZER-APPLYING IRRIGATION DEVICE
Filed Oct. 17, 1966
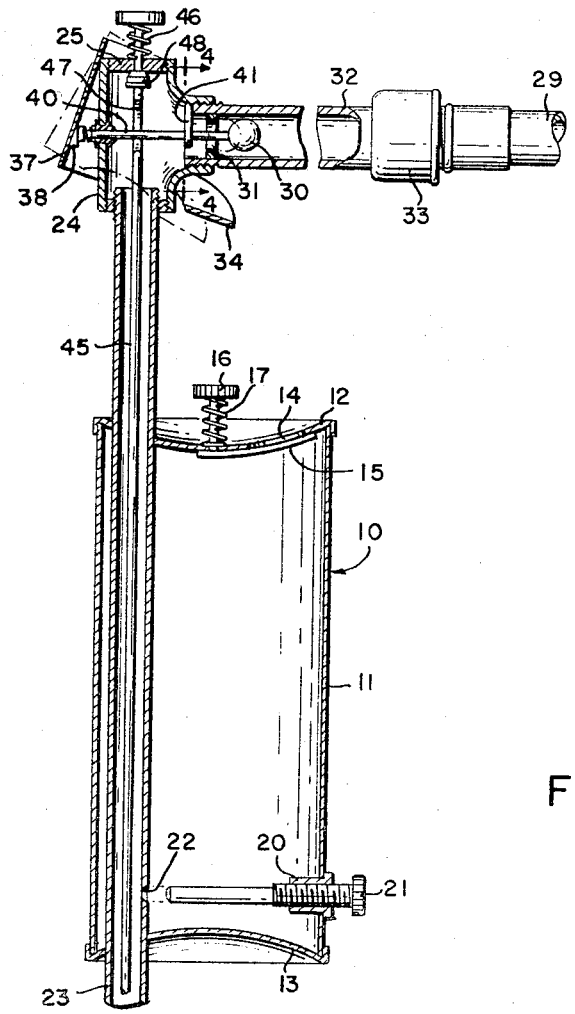
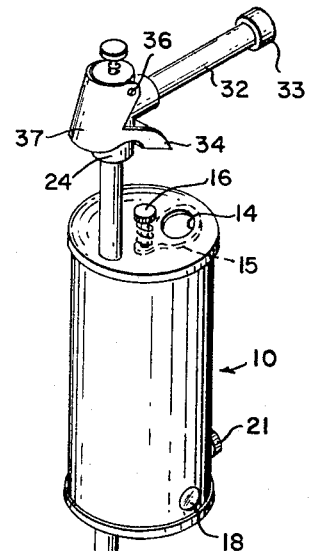
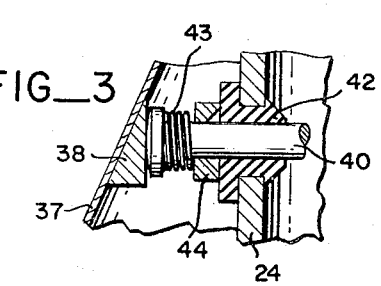
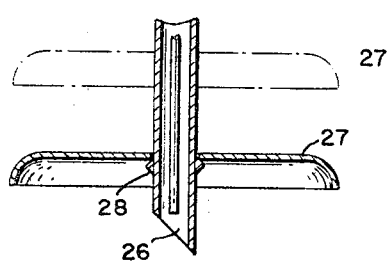
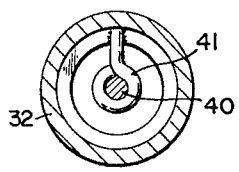
HAROLD C. NIMRICK
INVENTOR.
BY  *Seed & Berry*
ATTORNEYS

United States Patent Office

3,405,669
Patented Oct. 15, 1968

3,405,669
FERTILIZER-APPLYING IRRIGATION DEVICE
Harold C. Nimrick, 29219 Military Road,
Federal Way, Wash. 98002
Filed Oct. 17, 1966, Ser. No. 587,235
9 Claims. (Cl. 111—7.2)

ABSTRACT OF THE DISCLOSURE

This invention relates to a device for irrigating and fertilizing plant roots beneath the surface of the soil, and pertains more especially to a device in which a pressure stream of water which performs the irrigating function picks up and carries the fertilizer to the plant roots.

For its principal object the invention aims to provide a device for the purpose described having a manually controlled valve operating, when open, to supply a pressure stream of the irrigating water, and characterized in that upon such opening the delivered stream momentarily picks up a volume of the fertilizer and then runs clear, repeating this action on each occasion of the valve's opening.

A further object of the invention is to provide a device of this character which adapts itself to use with either dry or liquid fertilizers.

With the above and other objects in view looking to the provision of a simple and inexpensively constructed device which will efficiently perform the function for which it is intended, the invention consists in the novel construction and in the adaptation and combination of parts hereinafter described and claimed.

Description of drawings

In the accompanying drawings:

FIGURE 1 is a longitudinal vertical sectional view illustrating an irrigating and fertilizing tool constructed to embody preferred teachings of the present invention.

FIG. 2 is a perspective view thereof drawn to a reduced scale.

FIG. 3 is a fragmnetary longitudinal vertical detail sectional view employing a scale enlarged from that of FIG. 1; and FIG. 4 is a transverse vertical sectional view on line 4—4 of FIG. 1 employing a scale somewhat smaller than that of FIG. 3 but enlarged from the scale of FIG. 1.

Description of invention

Referring to said drawing, a container for fertilizer is denoted by the numeral 10 and is or may be comprised of an upright cylindrical shell 11 with top and bottom dished headers 12 and 13 press-fitted upon the two ends. The container is desirably formed from corrosion-resistant metal. The top header has a filler opening 14 therein, and a gate 15 is provided therefor. Such gate, which closes against the underside of the header, is swingable between open and closed positions by means of an exposed stem having a knurled head 16 thereon. The closure portion of the gate is faced about its perimeter with a rubber sealing gasket. A spring 17 presses the gasket against the header. A sight window 18 (FIG. 2) is provided in the wall of the container.

An internally-threaded bushing 20 is soldered or otherwise secured in the side wall of the container at a level elevated a moderate distance above the bottom of the container, and a metering valve 21 is threaded in said bushing for endwise adjustment toward and from a port 22 which connects the interior of the container with a delivery pipe 23. The pipe parallels the axial line of the container and fits openings which are provided in the top and bottom headers. Solder joints seal these openings and make the pipe and container an integral assembly. The pipe is of uniform diameter throughout the length and connects by its upper end with one of the two straight branches of a T-fitting 24. A center-bored plug 25 closes the other straight branch. A valve-governed pressure supply of water is supplied to the T-fitting through its side branch, feeding therefrom into the delivery pipe to issue from the lower end of the latter through a discharge opening 26. The discharge opening is cut on the bias. This gives the pipe a sharpened point for easy insertion into the ground and has the further function of increasing the area of the discharge opening so that back-pressure will be minimized. Splash protection is provided by a shield 27 receiving a free sliding fit on the delivery pipe. A ring 28 is sweated on the pipe to serve as a limit-stop.

The valve which governs the infeed of pressure water is comprised of a ball 30, hard rubber by preference, and closes with the pressure of the water against a seat 31. The seat surrounds an opening formed in a disc which is fixedly secured in the outlet end of a supply pipe 32. The supply pipe receives a thread fit in said side branch of the T-fitting and upon its other end provides a coupling 33 for attaching the supply pipe to a water hose 29.

In a manner which will be readily apparent, a user of the tool grasps the supply pipe in one hand with the forefinger curled under the trigger component 34 of a valve-controlling lever. Fulcrumed by trunnion pins 36 from the T-fitting, the lever is an elbowed lever of the second order formed to straddle the T-fitting with its work arm 37 overlying the back face thereof. Lifting of the trigger by contraction of the user's forefinger acts through a butt-block 38 to exert pressure upon the exposed front end of a push-rod 40 and responsively unseat the ball valve 30, which floats free within the pipe 32. An eye-pin 41 is welded or otherwise fixed to the supply pipe so that its eye coincides with the axis of the pipe, and the push-rod is guided in its slide movement by this eye and a sealing grommet 42. Valve-opening push movement of the rod 40 is yieldingly opposed by a spring 43. The spring bears by its inner end against a washer 44. Dished upon its inner face the pressure exerted by the washer against the grommet compresses the latter upon the push-rod to insure a leak-proof seal.

On occasion a pebble may lodge in the discharge opening 26 of the pipe 23. The throat is cleared of same by a push-rod 45 which extends the length of the pipe and has its upper end projecting through the center bore of the plug 25. A spring 46 normally holds the push-rod in an elevated position. A crook 47 formed in the rod provides clearance between the rod and the push-rod 40. Above said crook a seal 48 fits the push-rod 45 and is brought to bear against the plug by the spring 46.

In order to obtain my desired result, namely causing a relatively concentrated charge of fertilizer to be ejected for no more than a few moments, a "shot" period so to speak, upon each initial opening of the valve 30, and then causing the stream to issue as almost clear water until the trigger is released, it is important (1) that there be no restriction in the delivery pipe between the port 22 and the delivery opening 26, and (2) that the flow capacity of the port be substantially less than that of the pipe. By way of example, results are excellent when the pipe has a cross-sectional area of .084 square inch (the diameter of the pipe less that of the pebble ejector) and the port an area of .048 square inch. It is furthermore important that the opening which is governed by the valve 30 have a flow capacity no less than that of the delivery pipe.

It will be understood that the setting given to the metering valve 21 is largely determined by whether the container 10 is filled with a dry water-soluble fertilizer or a liquid concentrate. The valve is little more than "cracked" for liquid concentrate and opened wide for dry fertilizers.

Pressure changes are responsible for obtaining my "shot" action. On runs conducted with test equipment having an upstream gauge placed to indicate the pressure within the supply pipe adjacent the valved opening and a downstream gauge placed to indicate the pressure within the delivery pipe immediately below the fertilizer port 22, both gauges, upon an opening of the valve 30, show a rise of pressure after a momentary drop. It is of interest to note that a momentary pressure rise occurs within the fertilizer tank when the trigger is first depressed.

In the use of the tool, fertilizer in either a dry or liquid state is poured into the tank 10 through the filler opening 14, which is then closed by rotating the knob 16 in the degree necessary to bring the plate 15 into a position covering such opening. The pipe 23 is first pressed only a short distance into the ground and the trigger 34 compressed so as to open the valve 30, following which the pipe is pressed downwardly to the full distance desired. The surge of water down the pipe momentarily sets up a pressure of several pounds within the tank. This action agitates the fertilizer. Such momentary in-flow through port 22 reverses itself and a measured charge of fertilizer passes from the tank into the water stream within said pipe, being carried by the latter through the outlet 26 into the ground. Unless trigger 34 is released there then issues from the pipe 23 a stream of very nearly clear water. This can be beneficial in distributing the fertilizer through the soil. As above stated, the metering valve 21 is given a wide-open setting for course fertilizer such as bone meal. An opening of little more than a crack is suitable for liquid fertilizers.

The structure and manner of operation of the device is believed to be clearly understood from the foregoing description of my now-preferred illustrated embodiment. Changes in the details of construction can be resorted to without departing from the spirit of the invention and it is accordingly my intention that no limitations be implied and that the hereto annexed claims be given the broadest interpretation to which the employed language fairly admits.

What I claim is:

1. A device for fertilizing and irrigating the soil, comprising: a delivery pipe adapted to be held in an upright position and having the upper and lower ends open with said lower end formed for easy insertion into the soil, a fertilizer tank having a filler opening fitted with a closure plate and fixedly attached to the delivery pipe alongside the latter, a communicating connection between the lower end of the tank and the interior of the pipe, a hand-governed metering valve for said connection, a hollow handle for the device attached by an inner end to the upper end of the pipe with its hollow interior communicating with the top opening of the pipe and provided upon its outer end with a hose coupling for supplying water from a pressure source to said hollow interior, and a hand-operated 2-position valve means partially received within the handle acting in one of its two positions to deliver a stream of the pressure water to the delivery pipe and in the other position to close off the supply.

2. A device as claimed in claim 1 in which the delivery pipe is unobstructed and of uniform cross-section throughout its length.

3. A device as claimed in claim 2 in which the valved connection between the tank and the delivery pipe has a flow capacity, when fully open, substantially less than the flow capacity of the delivery pipe.

4. A device as claimed in claim 2 in which the opening closed by the 2-position valve has a flow capacity no less than the flow capacity of the delivery pipe.

5. A device as claimed in claim 2 in which said lower end of the pipe is cut on a steeply inclined bias.

6. A device as claimed in claim 2 having a rod extending within the pipe for the approximate length thereof and by downward movement endwise to its length serving to eject pebbles which may lodge in the lower end of the pipe, a spring being provided normally holding the rod in an elevated position, the upper end of the rod being exposed above the handle for application of hand pressure in depressing the same against the yielding force of said spring.

7. A device as claimed in claim 6 in which the handle is fabricated from pipe stock, being comprised of a short length of pipe to which the hose is attached and having its other end fitted in the side branch of a T-fitting which has the upper end of the delivery pipe fitted in one of its straight branches and a center-bored plug fitted in the other straight branch, the upper end of the pebble-ejecting rod being received for slide movement through said center-bore of the plug.

8. A device as claimed in claim 1 in which the handle includes a short horizontal length of pipe to which the hose is attached and having the other end fitted in the side branch of a T-fitting which has the upper end of the delivery pipe fitted in one of its straight branches and its other straight branch closed by a plug, the 2-position valve means comprising an elbow-shaped lever having one leg of the elbow straddling the T-fitting and fulcrumed by trunnion pins thereto and the other leg of the elbow underlying the horizontal pipe and serving as a trigger to open the portion of the valve means inside the handle against the pressure of the source of water supply, by squeeze pressure from the hand of an operator grasping the handle.

9. A device as claimed in claim 8 wherein a work arm of the lever overlies the back face of the T-fitting and presses against a valve-opening push-rod which is received for endwise sliding movement through a sealing grommet fitting an opening located in said back face coaxial to the horizontal pipe, the portion of the valve means inside the handle comprising a free-floating ball seating against a centrally apertured disc fixedly secured in the inner end of said horizontal pipe.

References Cited
UNITED STATES PATENTS

| | | | |
|---|---|---|---|
| 628,721 | 7/1899 | Farrington et al. | 175—313 |
| 1,755,445 | 4/1930 | Irish | 111—7.1 |
| 2,016,983 | 10/1935 | Bruce | 111—7.1 |
| 2,214,083 | 9/1940 | Lester | 111—7.1 X |
| 3,026,827 | 3/1962 | Cunningham | 111—7.1 |

ROBERT E. BAGWILL, *Primary Examiner.*